J. E. BROWN & J. N. CURLEE.
BABY CART.
APPLICATION FILED OCT. 12, 1915.

1,191,394.

Patented July 18, 1916.
2 SHEETS—SHEET 1.

Inventors
J.E.Brown,
J.N.Curlee,

Witnesses

By Victor J. Evans
Attorney

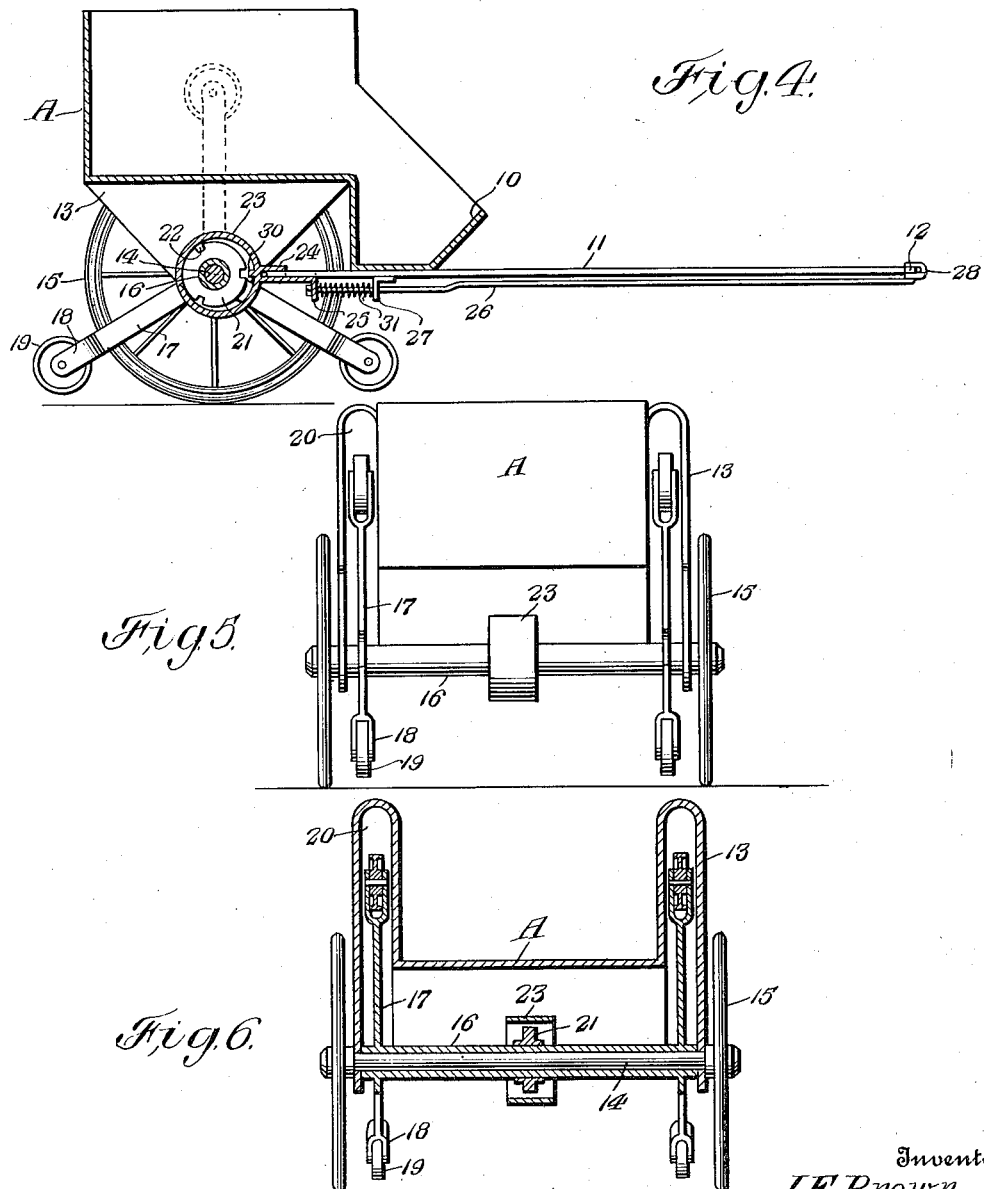

UNITED STATES PATENT OFFICE.

JOSEPH E. BROWN AND JASPER N. CURLEE, OF ARGENTA, ARKANSAS; SAID CURLEE ASSIGNOR OF ONE-HALF OF THE ENTIRE RIGHT TO HATTIE ROSBERRY, OF MEMPHIS, TENNESSEE.

BABY-CART.

1,191,394.  Specification of Letters Patent.  Patented July 18, 1916.

Application filed October 12, 1915. Serial No. 55,476.

*To all whom it may concern:*

Be it known that we, JOSEPH E. BROWN and JASPER N. CURLEE, citizens of the United States, residing at Argenta, in the county of Pulaski and State of Arkansas, have invented new and useful Improvements in Baby-Carts, of which the following is a specification.

The invention relates to a baby cart or the like vehicle.

The primary object of the invention is the provision of a cart of this character wherein it will be automatically lifted over a curb, thereby eliminating the necessity of bodily raising the same by the operator.

Another object of the invention is the provision of a cart of this character wherein it can be locked at rest to assure safety to the occupant, and will not jolt or jar such occupant when traveling over a curbstone, the cart being automatically raised or lowered thereover without burden upon the operator, nor will the said cart become upset when in the act of leaving the pavement to the street or vice versa.

A further object of the invention is the provision of a cart of this character wherein the task of carrying the same up or down doorsteps or stairs is entirely obviated, as it will be automatically lifted or lowered without any inconvenience to the operator nor rendering it hazardous to the occupant.

A still further object of the invention is the provision of a cart of this character which is simple in construction, reliable and efficient in operation, strong, durable, and inexpensive in manufacture.

With these and other objects in view the invention consists in the construction, combination and arrangement of parts as will be hereinafter fully described, illustrated in the accompanying drawings, and pointed out in the claims hereunto appended.

Figure 1:
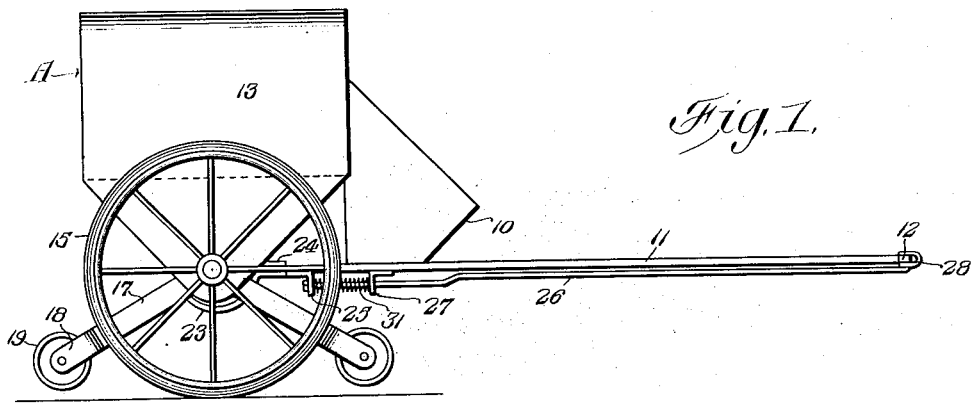
Figure 2:
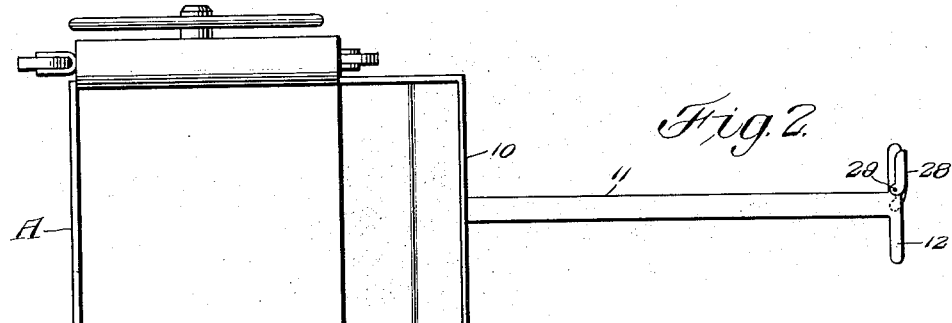
Figure 3:
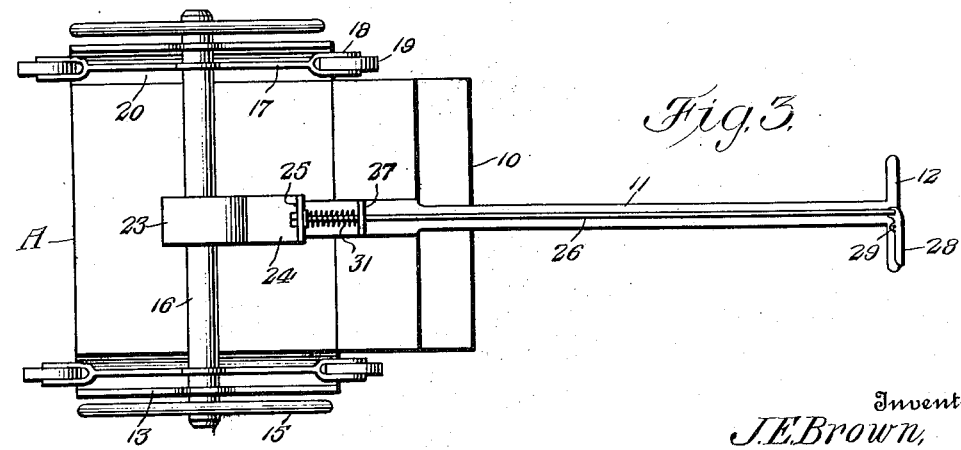

In the drawings: Figure 1 is a side elevation of a cart constructed in accordance with the invention. Fig. 2 is a top plan view thereof. Fig. 3 is a bottom plan view. Fig. 4 is a vertical longitudinal sectional view through the same. Fig. 5 is a rear elevation. Fig. 6 is a vertical transverse sectional view.

Similar reference characters indicate corresponding parts throughout the several views in the drawings.

Referring to the drawings in detail, the baby cart comprises a body A which forms a seat for an infant, and is provided at its front with a foot rest 10 to which is secured a handle 11 having at its free end a cross bar 12, the body A being made from any suitable material, and likewise the said rest 10 can be constructed in any desirable manner. Formed at the opposite sides of the body A are outwardly and downwardly bent members 13 which have fixed therein an axle 14 having journaled thereon traction wheels 15 so that the said cart can be pushed or pulled from any point to another.

Loosely surrounding the axle 14 between the members 13 is a hollow shaft or sleeve 16 to opposite ends of which are fixed three arm spiders 17, each arm being bifurcated at its free end to form a fork 18, and in these bifurcated or forked ends are journaled rollers 19, the arms of the spiders 17 being of a length to hold the rollers 19 slightly beyond the peripheries of the wheels 15 so that the said rollers 19 will be normally out of contact with the ground or foundation over which the wheels travel. The spiders 17 with the rollers 19 are adapted to rotate in the spaces 20 between the sides of the body A and the members 13, which latter constitute guards or shields therefor. On the hollow shaft or sleeve 16 centrally thereof is a disk 21 formed at three points in its periphery with notches 22, and surrounding this disk 21 is a brake band 23 provided with a sleeve-like guide extension 24 which is slidably fitted on the inner end of the handle 11, and upon this extension is formed an ear 25 to which is connected a rod 26, the same being trained through a guide ear 27 mounted on the under side of the handle 11, and is pivotally connected to an operating lever 28 pivoted at 29 to the cross bar 12 of the said handle 11 so that on operating the lever the brake band can be brought into frictional engagement with the periphery of the disk 21 and thereby retarding the rotation of the sleeve or shaft 16 carrying the spider 17 for a purpose presently described.

Formed on the sleeve-like extension 24 and projected into the brake band is a locking tongue 30 which is adapted to engage in any one of the notches 22 on the swinging of the lever 28 in one direction so as to lock the shaft or sleeve 16 against rotation on the axle 14 to hold the spider 17 against rotation, and thus prevent the tilting or rocking of the body A of the cart when the same is at rest.

Interposed between the ears 25 and 27 and surrounding the rod 26 is a coiled expansion spring 31 which serves to move the brake band away from the periphery of the disk 21 and to bring the tongue 30 into engagement in any one of the notches 22 in the said disk for the locking of the shaft or sleeve 16 upon the axle 14 when the lever 28 is moved in one direction. The brake band 23 is bent into loop form to encircle the disk 21, and on the swinging of the lever 28 in the reverse direction the band is brought into frictional contact with the periphery of the disk 21 for retarding the rotation of the sleeve 16 on the axle 14 for a purpose presently described.

In the operation of the baby cart, when it is desired to pull or push the same over a curbstone for the lifting of the cart from the street onto a pavement, the rollers 19 abut the curb, and under the exerted pull or push of the cart the spiders 17 are turned, which automatically lifts the cart from the street level to the pavement level, thereby obviating the necessity of bodily lifting the cart by hand as is usual. Now when the cart is to be moved over a curb from the pavement level to the street level the spiders 17 will be caused to rotate so that one pair of arms with its rollers will rest upon the pavement, while the other pair of arms with its rollers will rest upon the street surface, and at this moment it is necessary for the user of the cart to operate the lever 28 to bring the brake band 23 into frictional engagement with the disk 21, which retards the rotation of the spiders, and thus the wheels 15 will ride off of the curb and the said cart will be gradually lowered to the street surface without any undue jolt or jar to the infant occupant thereof. Now when the cart is at rest, on manipulating the lever 28 the tongue 30 can be thrown into locking engagement with any one of the notches 22 in the disk 21 and thereby locking the spiders 17 against rotation, and thus steady the cart to prevent undue rocking thereof when at rest to prevent the upsetting of the cart when occupied.

From the foregoing description, taken in connection with the accompanying drawings, the construction and manner of operation of the device will be clearly understood, and therefore a more extended explanation has been omitted.

What is claimed is:—

1. In a cart, the combination of a body, side members on the said body, an axle journaled in the side members, wheels journaled on the axle, a pair of three legged members rotatably mounted upon the axle and movable between the side members and the body of the cart, and rollers journaled in the legs of the members and protruded slightly beyond the peripheries of the wheels.

2. In a cart, the combination of a body, side members on the said body, an axle journaled in the side members, wheels journaled on the axle, a pair of three legged members rotatably mounted upon the axle and movable between the side members and the body of the cart, rollers journaled in the legs of the members and protruded slightly beyond the peripheries of the wheels, and means for braking the rotation of the three legged members.

3. In a cart, the combination of a body, side members on the said body, an axle journaled in the side members, wheels journaled on the axle, a pair of three legged members rotatably mounted upon the axle and movable between the side members and the body of the cart, rollers journaled in the legs of the members and protruded slightly beyond the peripheries of the wheels, means for braking the rotation of the three legged members, and coöperative means for locking the members against rotation.

4. In a cart, the combination of a body, side members on the said body, an axle journaled in the side members, wheels journaled on the axle, a pair of three legged members rotatably mounted upon the axle and movable between the side members and the body of the cart, rollers journaled in the legs of the members and protruded slightly beyond the peripheries of the wheels, means for braking the rotation of the three legged members, coöperative means for locking the members against rotation, and means for actuating the braking and locking means.

In testimony whereof we affix our signatures in presence of two witnesses.

JOSEPH E. BROWN.
JASPER N. CURLEE.

Witnesses:
S. C. CAMPBELL,
ERNEST LANTRIP.